US012555520B2

(12) United States Patent
Seong et al.

(10) Patent No.: US 12,555,520 B2
(45) Date of Patent: Feb. 17, 2026

(54) SELECTIVE DISPLAY DRIVING METHOD AND APPARATUS BASED ON THE CHARACTERISTICS OF LIGHT-EMITTING DIODE

(71) Applicant: SAPIEN SEMICONDUCTORS INC., Gyeonggi-do (KR)

(72) Inventors: Jewoo Seong, Gyeonggi-do (KR); Jin Woong Jang, Gyeonggi-do (KR); Jihaeng Lee, Gyeonggi-do (KR)

(73) Assignee: SAPIEN SEMICONDUCTORS INC., Gyeonggi-do (KR)

( * ) Notice: Subject to any disclaimer, the term of this patent is extended or adjusted under 35 U.S.C. 154(b) by 0 days.

(21) Appl. No.: 18/892,328

(22) Filed: Sep. 20, 2024

(65) Prior Publication Data

US 2025/0174177 A1 May 29, 2025

(30) Foreign Application Priority Data

Nov. 28, 2023 (KR) ........................ 10-2023-0167778
Jan. 30, 2024 (KR) ........................ 10-2024-0013710

(51) Int. Cl.
*G09G 3/32* (2016.01)
*G09G 3/20* (2006.01)

(52) U.S. Cl.
CPC ............. *G09G 3/32* (2013.01); *G09G 3/2007* (2013.01); *G09G 2310/08* (2013.01); *G09G 2320/0233* (2013.01); *G09G 2320/0242* (2013.01)

(58) Field of Classification Search
CPC .... G09G 3/2007; G09G 3/32; G09G 2310/08; G09G 2320/0233; G09G 2320/0242
See application file for complete search history.

(56) References Cited

U.S. PATENT DOCUMENTS 6,600,470 B1 * 7/2003 Tsuda ..................... G09G 3/367 349/162
11,145,260 B2 * 10/2021 Calayir ................ G09G 3/3611
(Continued)

FOREIGN PATENT DOCUMENTS

KR 20210095089 A 7/2021
KR 20230110931 A 7/2023

OTHER PUBLICATIONS

Korean Notice of Allowance issued on May 28, 2025, Application No. 10-2024-0013710; 7 pages.

*Primary Examiner* — Gene W Lee
(74) *Attorney, Agent, or Firm* — Eschweiler & Potashnik, LLC; Harris Kim

(57) ABSTRACT

Display driving method and device capable of selecting driving pulse types. The display device includes a plurality of pixels, each of the plurality of pixels including a luminous element and a pixel circuit connected to the luminous element; and a data driver configured to provide image data and luminance data of the pixels to the pixel circuit, wherein the image data comprises multi-bit values including a Most Significant Bit (MSB) and a Least Significant Bit (LSB); and a processor configured to generate a Pulse Width Modulation (PWM) signal based on the multi-bit values when the luminance data is greater than a threshold value, and control light-emission and non-emission of the luminous element through the PWM signal, and drive the LSB using an impulse signal when the luminance data is less than the threshold value.

15 Claims, 12 Drawing Sheets

(56) References Cited

U.S. PATENT DOCUMENTS

| | | | | |
|---|---|---|---|---|
| 12,073,781 | B2 * | 8/2024 | Kim | H05B 45/325 |
| 2023/0215352 | A1 * | 7/2023 | Kim | G09G 3/2092<br>345/690 |
| 2023/0230550 | A1 * | 7/2023 | Byun | G09G 3/3291<br>345/204 |
| 2024/0331616 | A1 * | 10/2024 | Lim | G09G 3/3233 |

* cited by examiner

SELECTIVE DISPLAY DRIVING METHOD AND APPARATUS BASED ON THE CHARACTERISTICS OF LIGHT-EMITTING DIODE

CROSS-REFERENCE TO RELATED APPLICATIONS

This application claims priority from and the benefit of Korean Patent Application No. 10-2023-0167778 filed on Nov. 28, 2023, and Korean Patent Application No. 10-2024-0013710 filed on Jan. 30, 2024, which are hereby incorporated by reference in its entirety.

TECHNICAL FIELD

The present disclosure relates to digital display driving circuits, and more particularly, to a method and device of selectively utilizing one of PWM signals or impulse signals for driving a display based on characteristics of image data.

BACKGROUND

A display using a light emitting diode (LED) may be applied to a wide range of field from a small mobile device to a large outdoor display device. In particular, the display is being used in more various fields, for example, various devices of a vehicle, an augmented reality (AR) device, and a virtual reality (VR) device.

A digital display may include a memory in a pixel. A digital display driving method stores data related to light to be output from a pixel for one frame and controls brightness using a pulse width modulation (PWM) method. Here, a subpixel emits light during alight emission time (on duty) within one frame based on image data stored in the memory in the pixel.

Each pixel of the digital display may include a plurality of LEDs. Therefore, there is a need for a driving method for ensuring linearity of brightness and expressing ideal color depending on characteristics and a brightness situation of a corresponding LED.

SUMMARY

Present disclosure provides display driving methods and devices for ensuring a linearity of brightness and expressing ideal colors depending on characteristics and a brightness situation of a light emitting diode (LED).

According to one embodiment, a display device includes a plurality of pixels, wherein each of the plurality of pixels includes a luminous element and a pixel circuit connected to the luminous element; and a processor configured to provide image data and luminance data of the pixels to the pixel circuit. When the luminance data is less than the threshold value, the pixel circuit configured to drive upper bits among the multi-bit values based on the PWM signal and lower bits among the multi-bit values based on the impulse signal. When the number of bits of the image data that are driven based on the impulse signal is determined based on an on-duty ratio corresponding to a light emission period within one frame.

Here, the threshold value may be determined based on at least one of a display driving frequency, an on-duty ratio, and the number of grayscale bits.

Alternatively, the threshold value may be determined based on grayscale-luminance linearity of each of the luminance element.

According to another embodiment, a display driving method includes receiving image data and luminance data on a display pixel that includes a plurality of LEDs; and driving at least one bit among bits corresponding to the image data using impulse signal when the luminance data is less than a preset reference value.

According to another embodiment, a display driving method includes receiving image data and luminance data on a display pixel from a processor; retrieving a luminance value from the luminance data; comparing the luminance value to a threshold value; and controlling light-emission and non-emission of a luminous element through a PWM signal and an impulse signal when the luminance data is less than the threshold value According to another embodiment, a display driving device includes a detector configured to detect luminance data from image data and the luminance data on a display pixel that includes a LED; a scan unit configured to select a PWM signal or an impulse signal based on the luminance data and, if the luminance data is less than a preset reference value, to generate a scan signal that includes the impulse signal and to output the scan signal to a row terminal of the display pixel; and a pixel driving circuit present in the display pixel and configured to drive the LED based on the image data and the scan signal.

Here, the scan signal may include the PWM signal corresponding to an upper bit of the image data and the impulse signal corresponding to a lower bit of the image data.

Here, a composition ratio of the PWM signal and the impulse signal may be adjusted in response to an on-duty ratio of one frame.

Here, a proportion of the impulse signal in the scan signal may increase according to a decrease in the on-duty ratio.

According to another embodiment, a display driving device includes a luminance decision memory configured to receive luminance data on a display pixel and to store the luminance data; a memory configured to store the bit values corresponding to image data; a controller configured to generate a first control signal based on the bit values and a PWM signal, and to generate a second control signal based on the bit values and an impulse signal; a selector configured to select the first control signal or the second control signal based on the luminance data; and a pixel driver configured to deliver, to an LED, or block driving current based on an output signal of the selector.

Here, the selector may be configured to select the first control signal if the luminance data is greater than or equal to a preset reference value and to select the second control signal if the luminance data is less than the preset reference value.

Here, the selector may be configured to select the first control signal in a section corresponding to an upper bit of the bit values and to select the second control signal in a section corresponding to a lower bit of the bit values if the luminance data is less than a preset reference value.

Here, the selector may be configured to identify each of a plurality of subpixels and to select the first control signal or the second control signal.

According to example embodiments, it is possible to ensure linearity of brightness and to improve ideal color expression capability according to characteristics and a brightness situation of an LED.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Embodiments will be described in more detail with regard to the figures, wherein like reference numerals refer to like parts throughout the various figures unless otherwise specified, and wherein.

DETAILED DESCRIPTION

Figure 1:
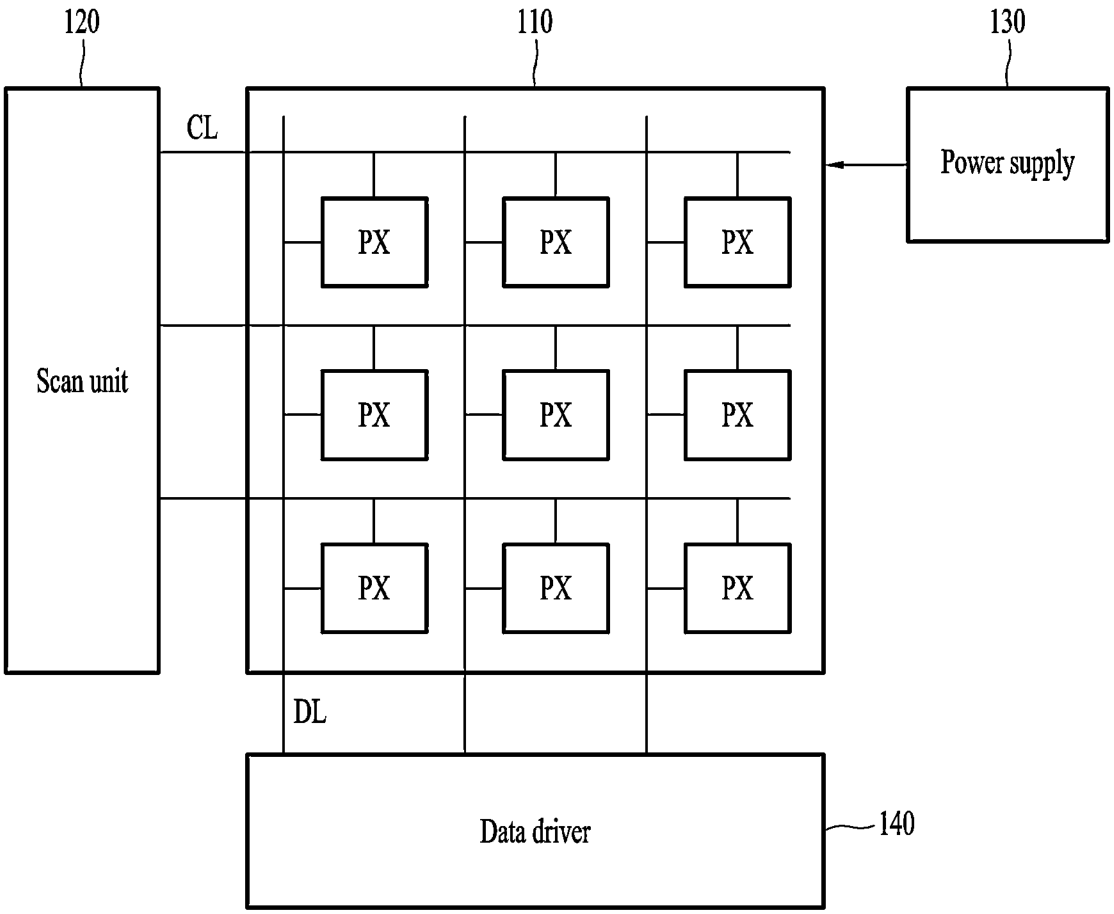
FIG. 1 illustrates a display device according to one embodiment.

The following structural or functional descriptions of example embodiments according to the concept of the present invention described herein are merely intended for the purpose of describing the example embodiments according to the concept of the present invention and the example embodiments according to the concept of the present invention may be implemented in various forms and are not construed as limited to the example embodiments described herein.

Various modifications and various forms may be made to the example embodiments according to the concept of the present invention and thus, the example embodiments are illustrated in the drawings and is described in detail through the present specification. However, it should be understood that the example embodiments according to the concept of the present invention are not construed as limited to specific implementations and should be understood to include all changes, equivalents, and replacements within the idea and the technical scope of the present invention.

Although terms of "first," "second," and the like are used to explain various components, the components are not limited to such terms. These terms are used only to distinguish one component from another component. For example, a first component may be referred to as a second component, or similarly, the second component may be referred to as the first component without departing from the scope according to the concept of the present invention.

When it is mentioned that one component is "connected" or "accessed" to another component, it may be understood that the one component is directly connected or accessed to another component or that still other component is interposed between the two components. In addition, when it is described that one component is "directly connected" or "directly accessed" to another component, it should be understood that still other component is absent therebetween. Likewise, expressions, for example, "between" and "immediately between" and "immediately adjacent to" may also be construed as described in the foregoing.

The terminology used herein is for the purpose of describing particular example embodiments only and is not to be limiting of the present invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, stages, operations, elements, components or combinations thereof, but do not preclude the presence or addition of one or more other features, integers, stages, operations, elements, components, or combinations thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Hereinafter, example embodiments will be described in detail with reference to the accompanying drawings. However, the scope of the claims is not limited to or restricted by the example embodiments. Like reference numerals presented in the respective drawings refer to like components throughout.

FIG. 1 illustrates a display device according to one embodiment of the present disclosure.

Referring to FIG. 1, the display device may include a pixel array 110, a scan unit 120, a power supply 130, and a data driver 140.

The pixel array 110 may include a plurality of pixels (PXs) arranged in a predetermined pattern, for example, among various patterns such as a matrix type and a zigzagged type.

Each pixel (PX) may include a plurality of LEDs. The LED represents a light emitting diode. For example, a single pixel (PX) may include a red (R) LED, a green (Gr) LED, and a blue (B) LED. The LEDs may have a size of micro to nanoscales.

Each pixel (PX) may include a pixel driving circuit configured to drive the plurality of LEDs. The pixel driving circuit may include thin film transistors and at least one capacitor. The pixel circuit may be implemented through a semiconductor stacking structure on a substrate.

The scan unit 120 may drive and control the pixel array 110. The scan unit 120 may include a pulse width modulation (PWM) signal generator and a clock signal generation circuit.

The scan unit 120 may provide brightness information or luminance data to each pixel. Also, the scan unit 120 may use the same information or data to generate a clock signal.

The power supply 130 may generate current for driving of each pixel and may supply the current to each pixel.

The data driver 140 may deliver image data to each pixel. Here, the image data may be expressed as bit values and the data driver 140 may provide the bit values to a pixel every frame. The bit values may have one of a first logic level and a second logic level. The first logic level and the second logic level may be a high level and a low level, respectively. Alternatively, the first logic level and the second logic level may be the low level and the high level, respectively.

Figure 2:
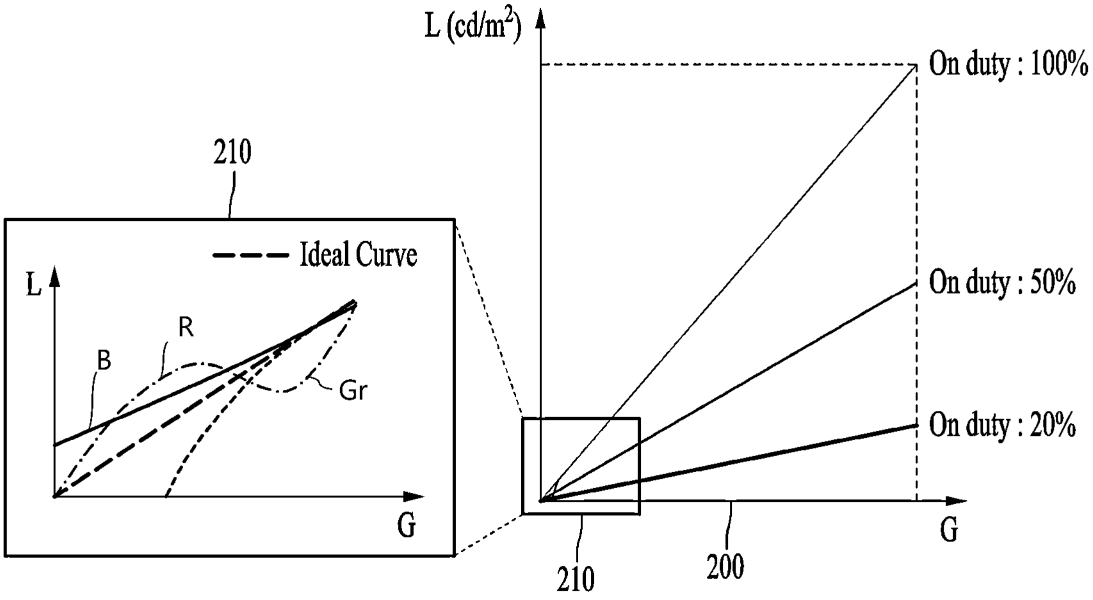
FIG. 2 illustrates an example of describing a brightness characteristic of a light emitting diode (LED) according to grayscale information of image data.

FIG. 2 illustrates an example of describing brightness characteristics of LEDs according to grayscale information of image data.

Referring to FIG. 2, a grayscale (G)-luminance (L) graph 200 of an LED shows a brightness of the LED according to the grayscales. Here, an ideal brightness of the LED may have a linearity according to an increase in the grayscales.

A gradient of ideal brightness of the LED may be determined based on an on-duty. For example, the on-duty may be 100%, 50%, or 20%. Here, a nonlinearity of brightness may occur in a low grayscale region 210 according to characteristics of the LED.

In the grayscale (G)-luminance (L) graph 200, L represents luminance of the LED and G represents a grayscale value. Therefore, relationship of L=aG is established. Here, a denotes an on-duty factor.

In the low grayscale region 210 of FIG. 2, the three curves R, Gr, B represent examples of the nonlinear characteristics of R, G, and B subpixels, respectively.

That is, in the low grayscale region 210, the LED may represent nonlinear brightness characteristics. For example, when a grayscale expression from 0 to 256 is possible, bit values of 8 bits may be required, and the low grayscale region 210 may correspond to a grayscale region from 1 to 10.

The nonlinearity of brightness may cause an issue that grayscale information is not accurately expressed in the low grayscale region 210. Also, in the case of driving based on a PWM method to prevent a color shift phenomenon, short pulses of hundreds of nanoseconds (ns) may lower efficiency. Therefore, there is a need for an appropriate driving method that considers characteristics of the LED in the low grayscale region 210.

Figure 3:
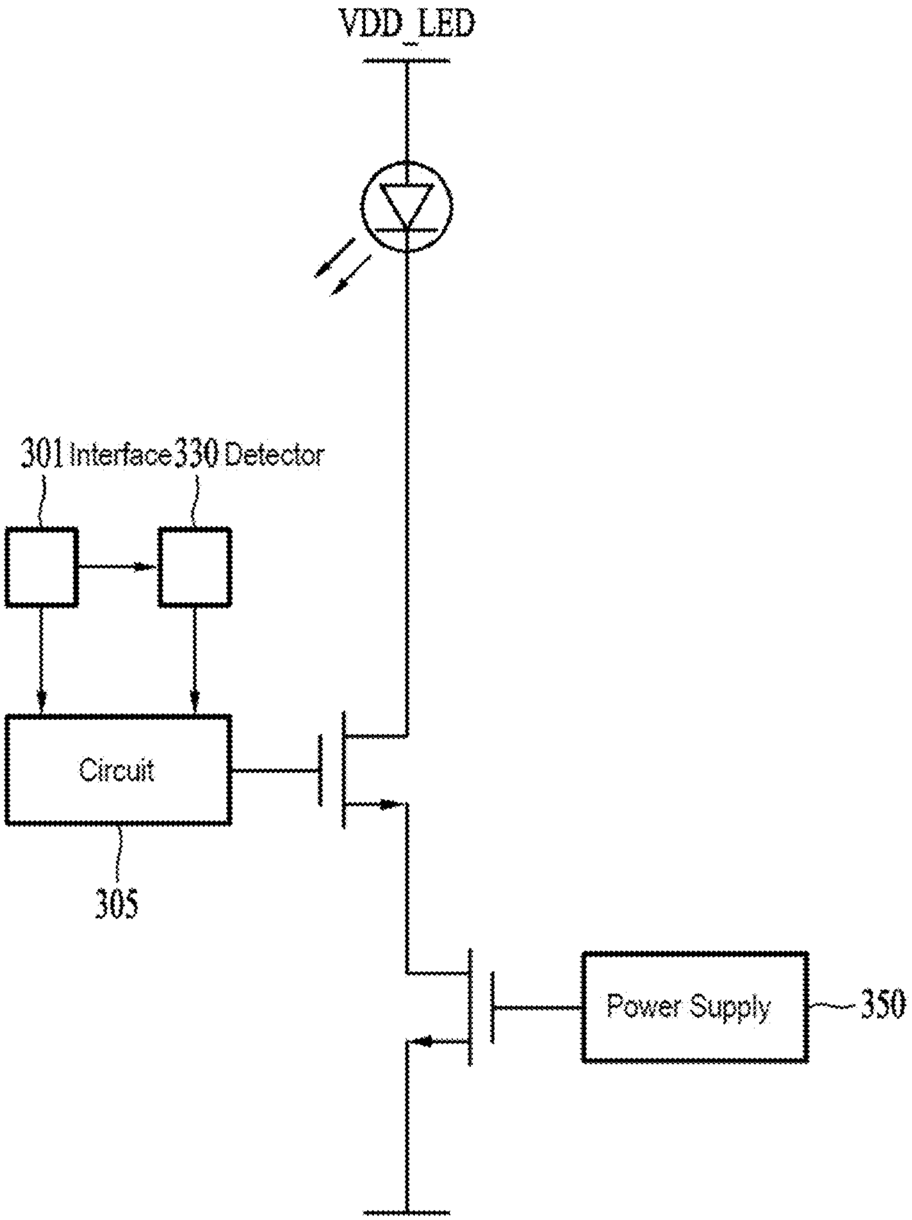
FIG. 3 illustrates an example of describing the operating principle of a display driving device according to one embodiment.

FIG. 3 illustrates an example of describing the operating principle of a display driving device according to one embodiment.

The display operating principle according to an example embodiment relates to selectively driving a display according to a grayscale region in consideration of characteristics of an LED.

The display operating principle according to one embodiment relates to driving the LED with an impulse signal rather than a PWM driving method in the low grayscale region 210. Here, the impulse signal represents a temporally shortest digital signal that may be generated by a display device with surge current or voltage.

Referring to FIG. 3, the display driving device may include an interface 301 configured to receive image data and luminance data on a display pixel. The interface 301 may be connected to a column line or a row line. The luminance data may be a value determined by a host device. Also, the luminance data may be a value converted into bit data after being sensed through a sensor.

Also, the display driving device may include a detector 330 configured to detect the luminance data. Here, depending on system settings, on-duty ratio information corresponding to a light emission period within one frame may be additionally provided to the detector 330.

Also, the display driving device may include a power supply 350 configured to supply power for driving the LED.

In FIG. 3, reference numeral 305 represents a circuit for driving the LED with the impulse signal in the low grayscale region 210. Therefore, if the luminance data is less than a preset reference value, the circuit 305 may drive at least one bit among bits corresponding to the image data based on the impulse signal.

Also, the circuit 305 may drive a plurality of LEDs based on the impulse signals if the luminance data is less than a preset reference value and may drive the plurality of LEDs based on the PWM signals if the luminance data is greater than or equal to the preset reference value.

Here, the circuit 305 may be provided inside a pixel or outside the pixel. Alternatively, some components of the circuit 305 may be provided inside the pixel and remaining components thereof may be provided outside the pixel.

A display device including the driving device of FIG. 3 may include a plurality of pixels and a processor.

The plurality of pixels may include a luminous element and a pixel circuit connected to the luminous element. Here, the pixel circuit may be the driving device of FIG. 3.

The processor may be configured to provide image data and luminance data of the pixels to the pixel circuit.

Here, the image data may be represented by a multi-bit values consisting of a Most Significant Bit (MSB) and a Least Significant Bit (LSB).

The pixel circuit may be configured to generate a pulse width modulation (PWM) signal based on the multi-bit values.

The pixel circuit may control a light-emission and non-light emission of the luminous element through a PWM signal and may drive the LSB using an impulse signal when the luminance data is less than a threshold value.

Here, if the luminance data is less than the threshold value, the pixel circuit may drive upper bits among the multi-bit values based on the PWM signal and may drive lower bits among the multi-bit values based on the impulse signal.

Selective display driving based on LED characteristics according to one embodiment allows the combination of various driving methods. Hereinafter, various driving methods are described with reference to FIGS. 4 to 12 below.

Figure 4:
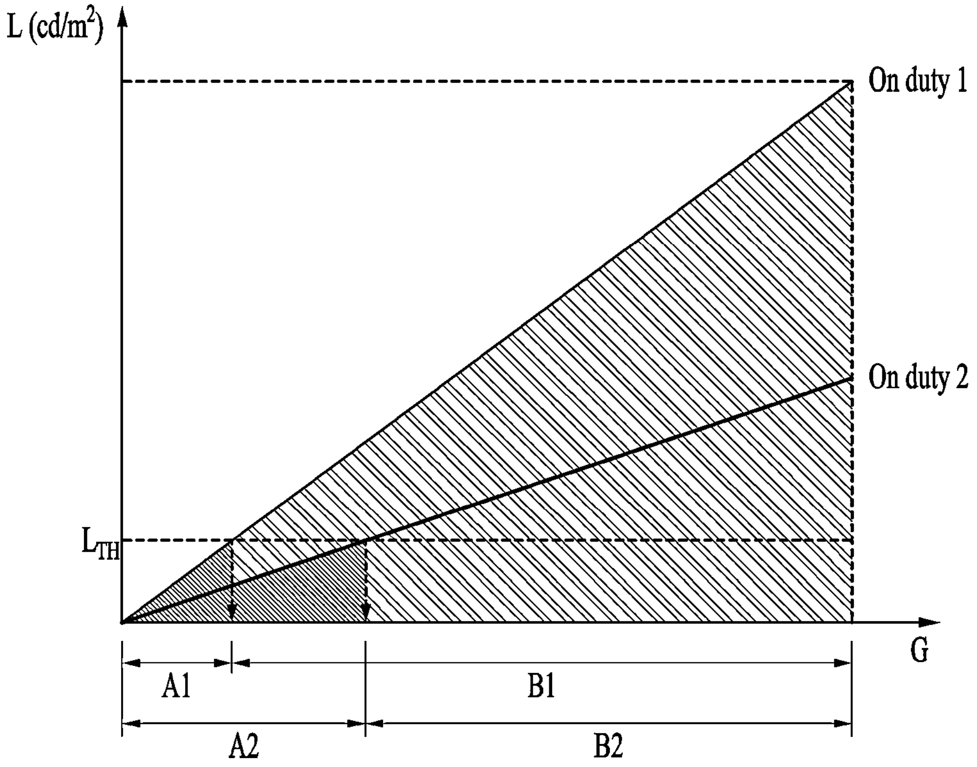
FIG. 4 is a graph showing an example of selective display driving according to one embodiment.

FIG. 4 is a graph showing an example of selective display driving according to one embodiment.

Referring to FIG. 4, selective display driving may change a driving method based on $L_{TH}$ that may be a threshold or a reference value.

Referring to FIG. 4, in the case of On duty 1, low grayscale region A1 may drive an LED using an Impulse driving method and remaining region B1 may drive the LED using a PWM driving method.

Also, in the case of On duty 2, low grayscale region A2 may drive the LED using the Impulse driving method and remaining region B2 may drive the LED using the PWM driving method.

Therefore, if luminance data is less than a preset reference value, an upper bit among bits corresponding to image data may drive the LED based on a PWM signal and a lower bit may drive the LED based on an impulse signal.

The number of lower bits driven based on the impulse signal among the bits corresponding to the image data may be adjusted based on an on-duty ratio. Information on the on-duty ratio may be provided to a pixel driving circuit as brightness information.

Figure 6:
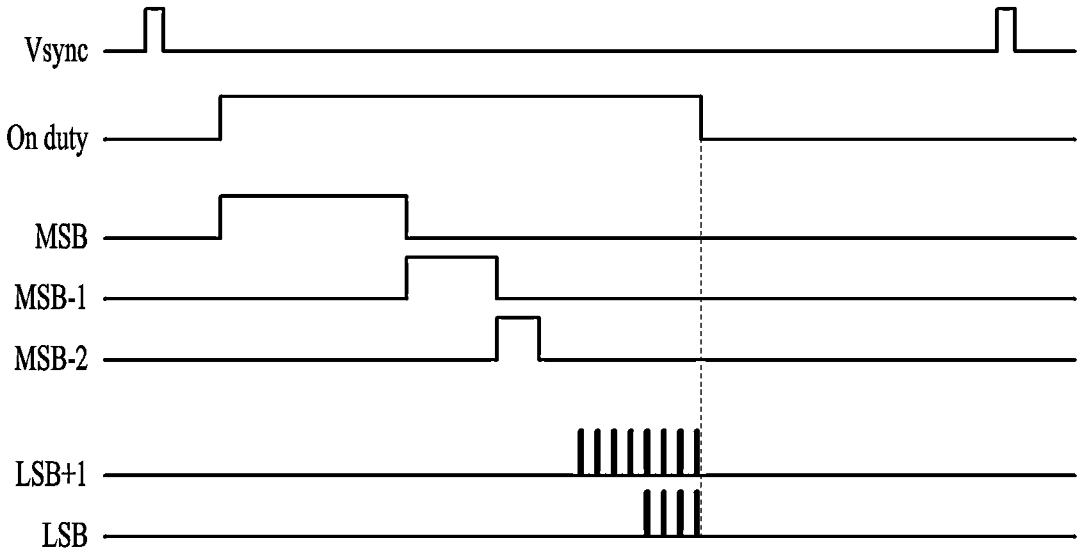
FIG. 6 is a signal timing diagram for describing pixel driving according to one embodiment.

For example, as shown in FIG. 6, in the case of On duty 1, lower bits, least significant bit (LSB) and LSB+1, may be driven using an impulse signal method. In the case of On duty 2, LSB, LSB+1, LSB+2, and LSB+3 may be driven using the impulse signal method.

Meanwhile, $L_{TH}$ that may be a threshold or a reference value may be a fixed value depending on characteristics of the LED provided to the display device. Here, the LED may include an R subpixel, a G subpixel, and a B subpixel, and the reference value may be determined by considering grayscale-luminance linearity of each of the R subpixel, the G subpixel, and the B subpixel. For example, the LED may be driven using an impulse signal for a specific grayscale value or less, in consideration of a section in which nonlinearity of any one of the R, G, and B subpixels is expected.

Also, $L_{TH}$ may be a value that changes depending on settings of the display device. For example, $L_{TH}$ may be determined based on at least one of a driving frequency ($F_{FRAME}$), an on-duty ratio, and the number of grayscale bits N.

Here, if one frame is $T_{FRAME}$ and an on-duty section is $T_{ON}$, the following formula may be established.

$$T_{ON} = 1/F_{FRAME} \times \text{ON DUTY } (\%) \quad \text{[Equation 1]}$$

$$T_{ON} = T_{LSB} \times 2^N (N\text{: \# of grayscale bit})$$

$$T_{LSB} \times G_{TH} =$$

$$T_{TH}(G_{TH}\text{: Threshold of the grayscale}/G\text{: } 0\sim 2^N) \rightarrow G_{TH} =$$

$$F_{FRAME} \times T_{TH} \times 2^N/\text{ON DUTY } (\%)$$

The brightness information provided to the display pixel may include at least one of information on $L_{TH}$, luminance data, and on-duty information.

Figure 5:
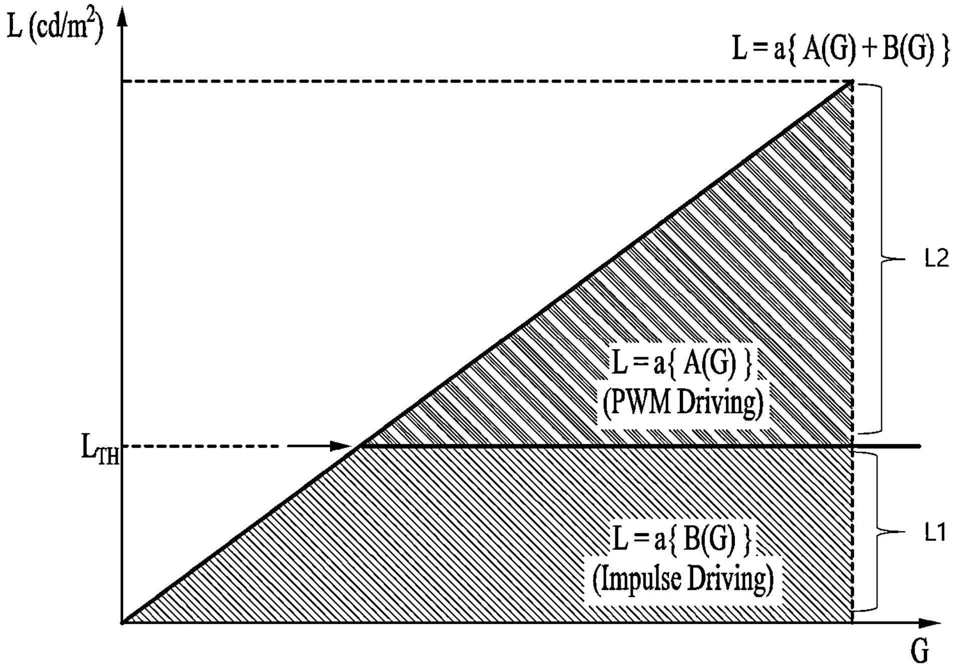
FIG. 5 is a graph showing another example of selective display driving according to one embodiment.

FIG. 5 is a graph showing another example of selective display driving according to one embodiment.

Referring to FIG. 5, $L_{TH}$ that may be a threshold or a reference value may be determined in the same manner as the embodiment of FIG. 4.

However, in the case of FIG. 5, regardless of grayscale information, if brightness information is greater than $L_{TH}$, the PWM driving method may be used, and if the brightness information is less than or equal to $L_{TH}$, the driving method using impulse signals may be used.

Referring to FIG. 5, a brightness section using the PWM driving method may be a region in which L=a{A(G)}, and a brightness section using the driving method using the impulse signal may be a region in which L=a{B(G)}.

FIG. 6 is an example signal timing diagram to show how to produce a pixel driving signal according to one embodiment.

As shown in FIG. 6, the driving method combines the PWM signals of MSB, MSB-1 and MSB-2 and the impulse signals of LSB+1 and LSB.

Referring to FIG. 6, in an on-duty section, an upper bit among bits corresponding to image data may drive an LED based on the PWM signal and a lower bit may drive the LED based on the impulse signal.

Here, MSB, MSB-1, . . . , LSB+1, LSB signals may be clock signals generated by the scan unit 120 of FIG. 1. Also, MSB, MSB-1, . . . , LSB+1, LSB signals may be clock signals used in each of pixels of FIG. 1. A clock signal may be used as a scan signal that is input to a Row line. The LED may emit light in a section in which the scan signal and the bit values of the image data are all high levels.

Figure 7:
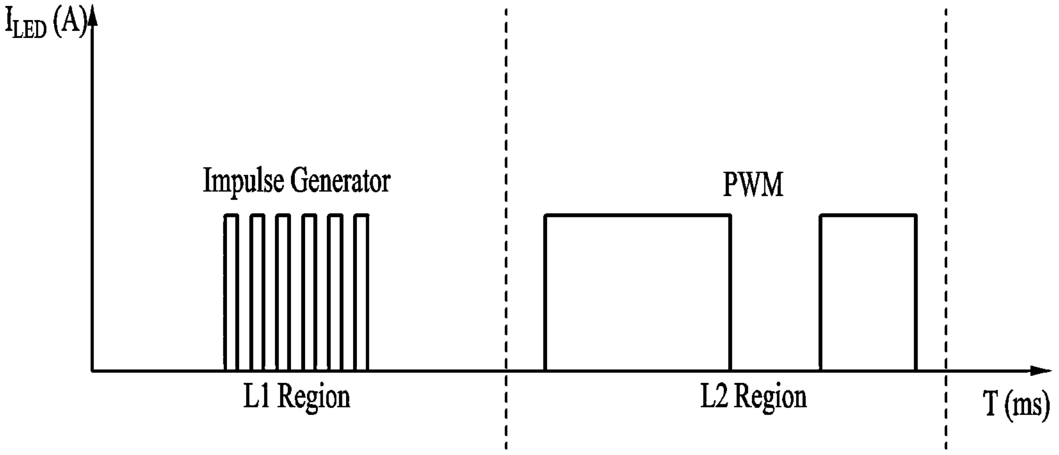
FIG. 7 illustrates a detailed example of display driving of FIG. 5.

FIG. 7 illustrates another example the display driving method of FIG. 5.

Referring to FIG. 7, an LED may be driven by using impulse signals in the L1 region of FIG. 7, and by using PWM signals in the L2 region.

Figure 8:
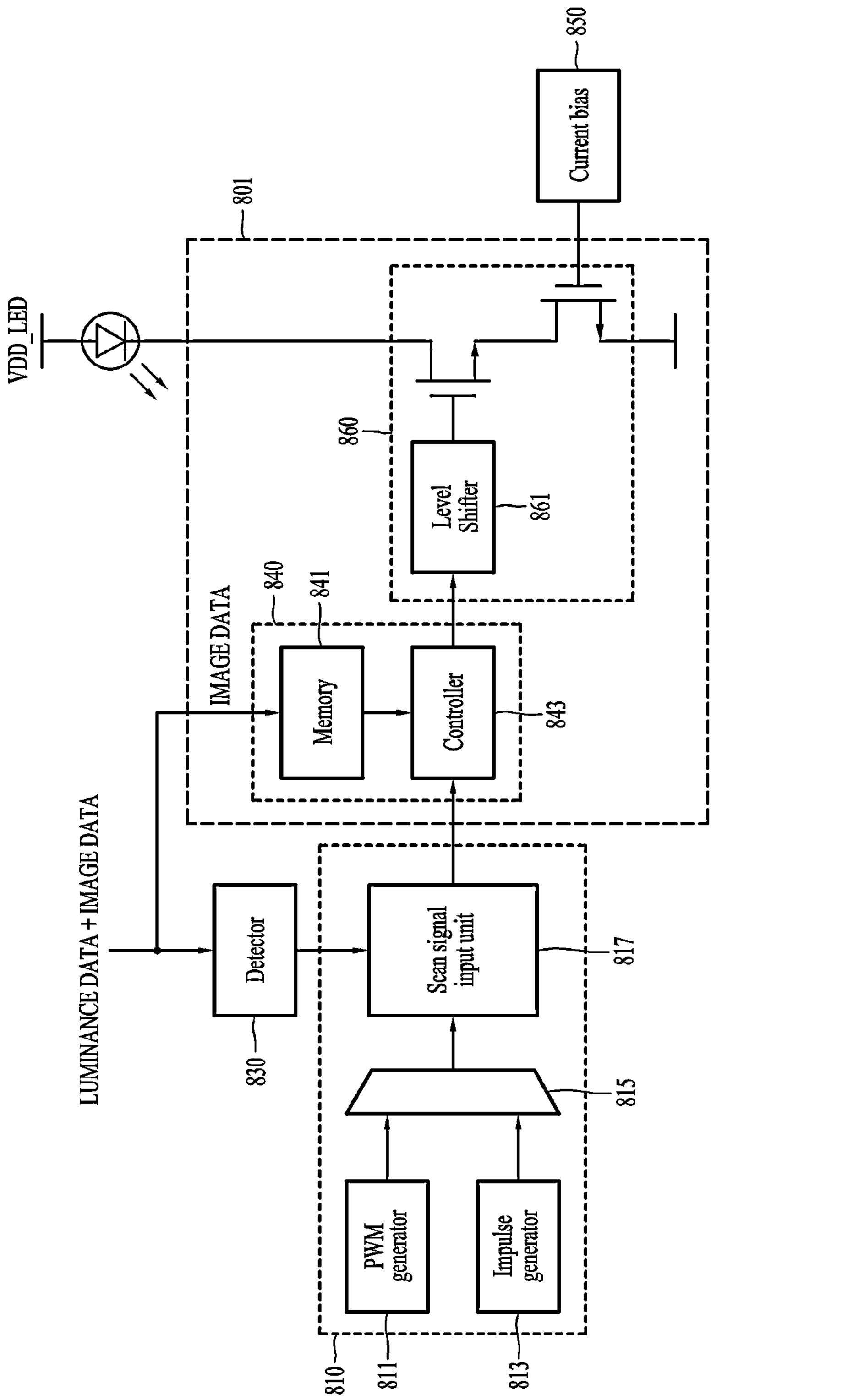
FIG. 8 illustrates a configuration of a display driving device according to one embodiment.

FIG. 8 illustrates an example configuration of a display driving device according to one embodiment.

The configuration of FIG. 8 represents a method of determining a driving method based on LED brightness information, reference value $L_{TH}$, and on-duty information outside a pixel 801.

Referring to FIG. 8, the display driving device includes the detector 830, the scan unit 810, and the pixel driving circuit (840, 860).

The detector 830 detects luminance data from image data and the luminance data input from the data driver 140 of the display device.

The scan unit 810 may select PWM signals or impulse signals to drive an LED based on the luminance data. If the luminance data is less than a preset reference value, the scan unit 810 produces a scan signal including impulse signals. The scan signal may be fed to the pixel 801 through a row terminal of the display pixel. Here, an example of the scan signal the signals illustrated in FIG. 6.

The scan unit 810 may include a PWM signal generator 811, an impulse generator 813, a selector 815, and a scan signal input unit 817.

Figure 13:
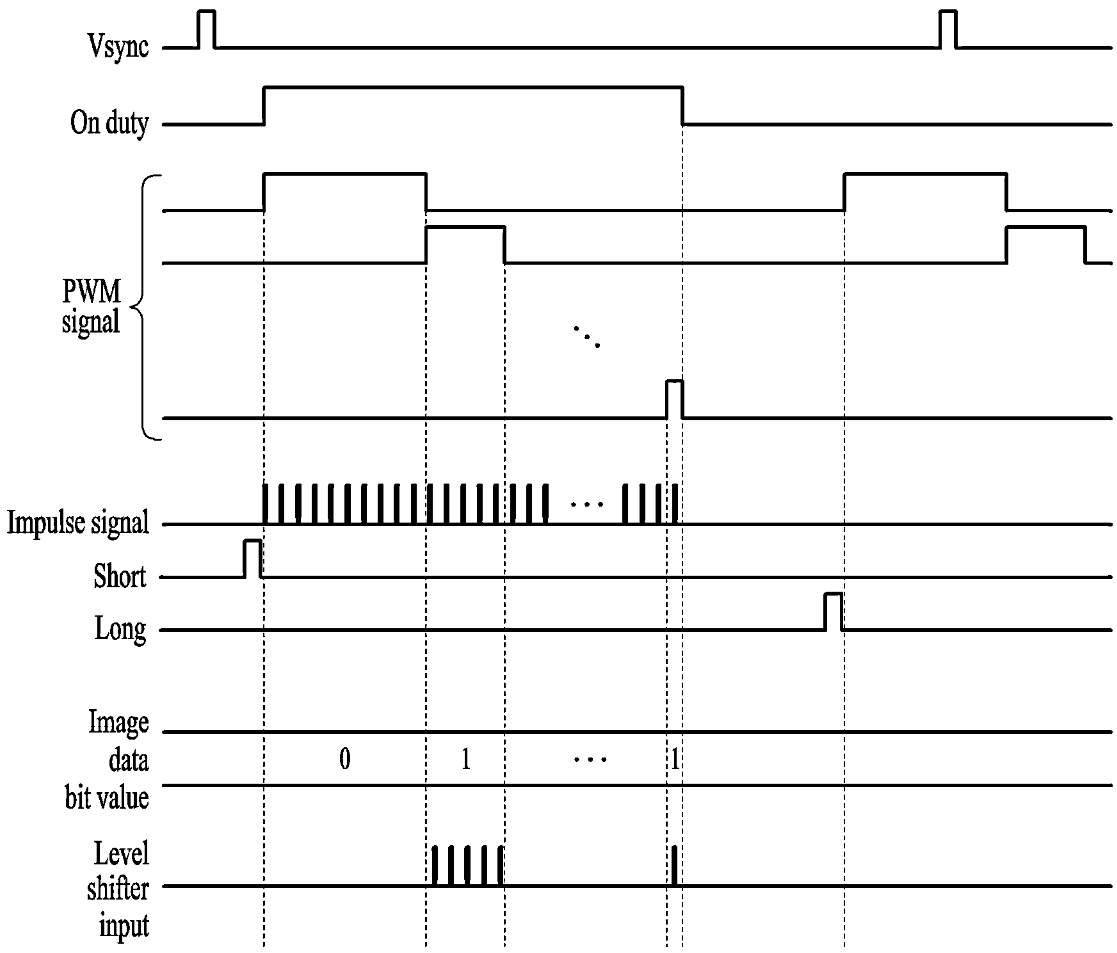
FIG. 13 illustrates an example of describing relationship between the respective signals according to one embodiment.

The PWM signal generator 811 may generate, for example, the PWM signal shown in FIG. 13. The impulse generator 813 may generate, for example, the impulse signal shown in FIG. 13.

While the impulse signal may be inputted from the outside of the display driving device, the impulse generator 813 may be replaced with an interface that receives the impulse signal.

The selector 815 may generate the signals shown in FIG. 6 by selecting one of the output of the PWM signal generator 811 and the output of the impulse generator 813 based on the luminance data and the low grayscale region reference value.

The scan signal input unit 817 receives an output signal of the selector 815 and inputs a scan signal to a row line for scanning. Therefore, the pixels connected to the same row line receive the same scan signals.

The pixel driving circuit may be included in the display pixel 801 and drive the LED based on the image data and the scan signals. The pixel driving circuit includes the control circuit 840 and the pixel driver 860.

The control circuit 840 includes a memory 841 configured to store the bit values of the image data. The control circuit 840 includes a controller 843 configured to output a control signal using the scan signals and the bit values stored in the memory 841.

Here, the scan signal may include a PWM signal corresponding to an upper bit of the image data and an impulse signal corresponding to a lower bit of the image data.

As shown in FIG. 4, a composition ratio of the PWM signals and the impulse signals in the scan signal may be adjusted based on an on-duty ratio within one frame. Here, in FIG. 4, in the case of On duty 2, low grayscale region A2 is larger and in the case of On duty 1, low grayscale region A1 is larger. Therefore, according to a decrease in the on-duty ratio, a proportion of the impulse signal in the scan signal may increase.

The controller 843 may output the control signal to a level shifter 861 based on the scan signal and the bit values stored in the memory 841. For example, the control signal may be configured as in 'level shifter input' of FIG. 12.

The pixel driving circuit 860 may include the level shifter 861 and a pixel driver configured to drive the LED.

The level shifter 861 converts the control signal to a gate-on voltage level signal capable of turning on a transistor and a gate-off level signal capable of turning off the transistor.

A current bias 850 of FIG. 8 performs the same functionality as that of the power supply 130 of FIG. 1.

Figure 9:
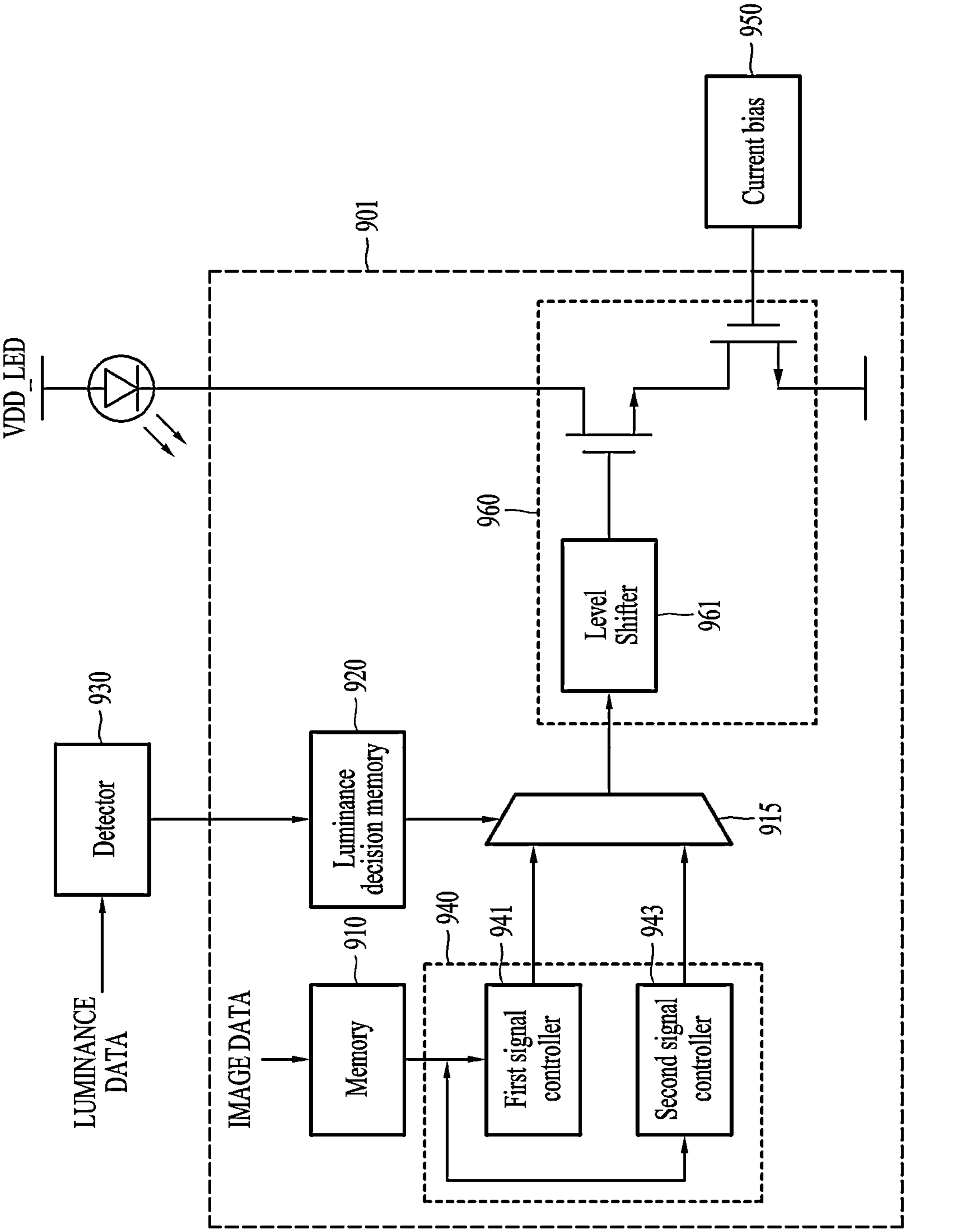
FIG. 9 illustrates a configuration of a display driving device according to another example embodiment.

FIG. 9 illustrates a configuration of a display driving device according to another example embodiment.

An example of FIG. 9 shows a method of determining a driving method based on LED brightness information, reference value $L_{TH}$, and on-duty information inside a pixel 901.

Referring to FIG. 9, the display driving device includes a luminance decision memory 920 configured to receive luminance data from a detector 930 outside the pixel 901 and to store the luminance data, a memory 910, a controller 940, a selector 915, and a pixel driver 960.

The memory 910 stores the bit values corresponding to the image data.

The controller 940 includes a first signal controller 941 configured to generate a first control signal based on the bit values and a PWM signal and the second signal controller 943 configured to generate a second control signal based on the bit values and an impulse signal. In this case, the impulse signal may be input from the outside of the pixel 901 or may be generated within the second signal controller 943.

The selector 915 selects the first control signal or the second control signal based on the luminance data.

If the luminance data is greater than or equal to a preset reference value, the selector 915 may select the first control signal. If the luminance data is less than the preset reference value, the selector 915 may select the second control signal.

If the luminance data is less than the preset reference value, the selector 915 may select the first control signal in a section corresponding to an upper bit of the bit values and may select the second control signal in a section corresponding to a lower bit of the bit values.

Figure 12:
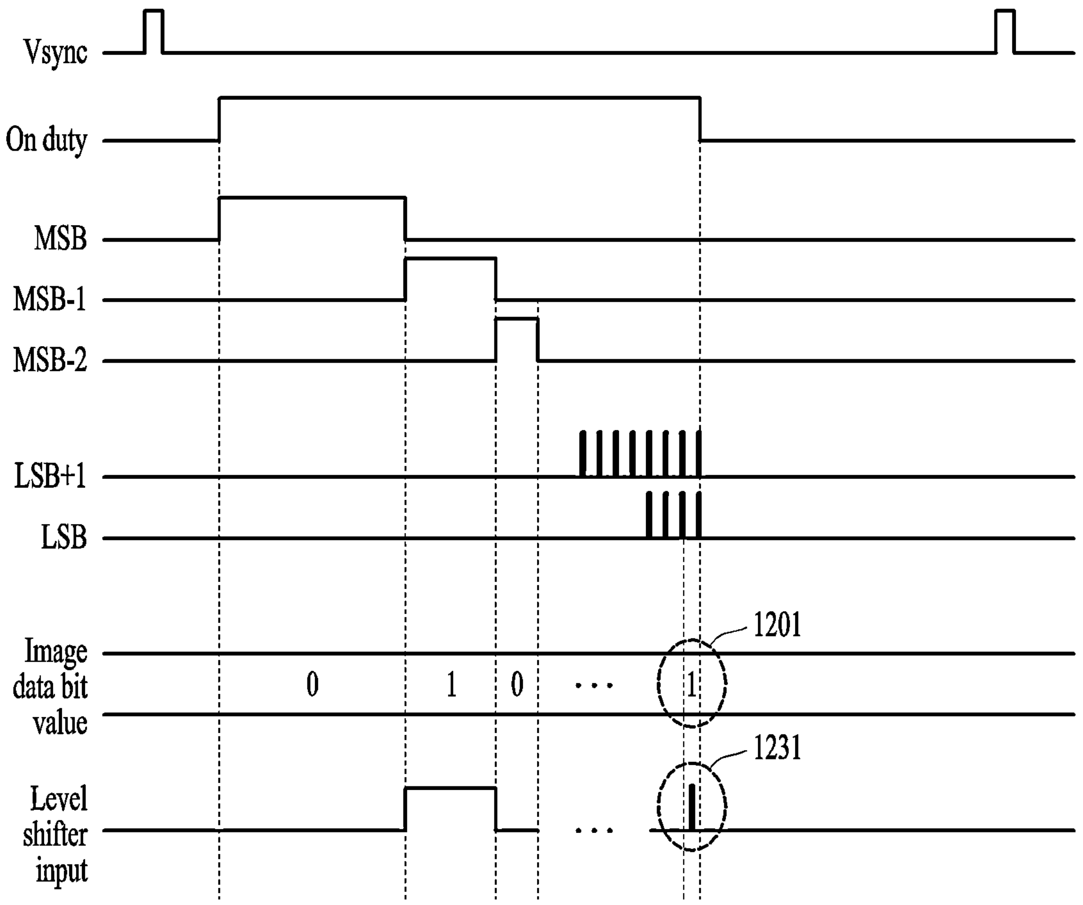
FIG. 12 illustrates an example of a pixel driver input signal according to one embodiment.

Therefore, an output signal of the selector 915 may be configured as in 'level shifter input' of FIG. 12 or 'level shifter input' of FIG. 13.

The pixel driver 960 may deliver, to an LED, or block driving current based on the output signal of the selector 915.

The level shifter 961 converts the control signal to a gate-on voltage level signal capable of turning on a transistor and a gate-off level signal capable of turning off the transistor.

A current bias 950 of FIG. 9 performs the same functionality as that of the current bias 850 of FIG. 8.

Figure 10:
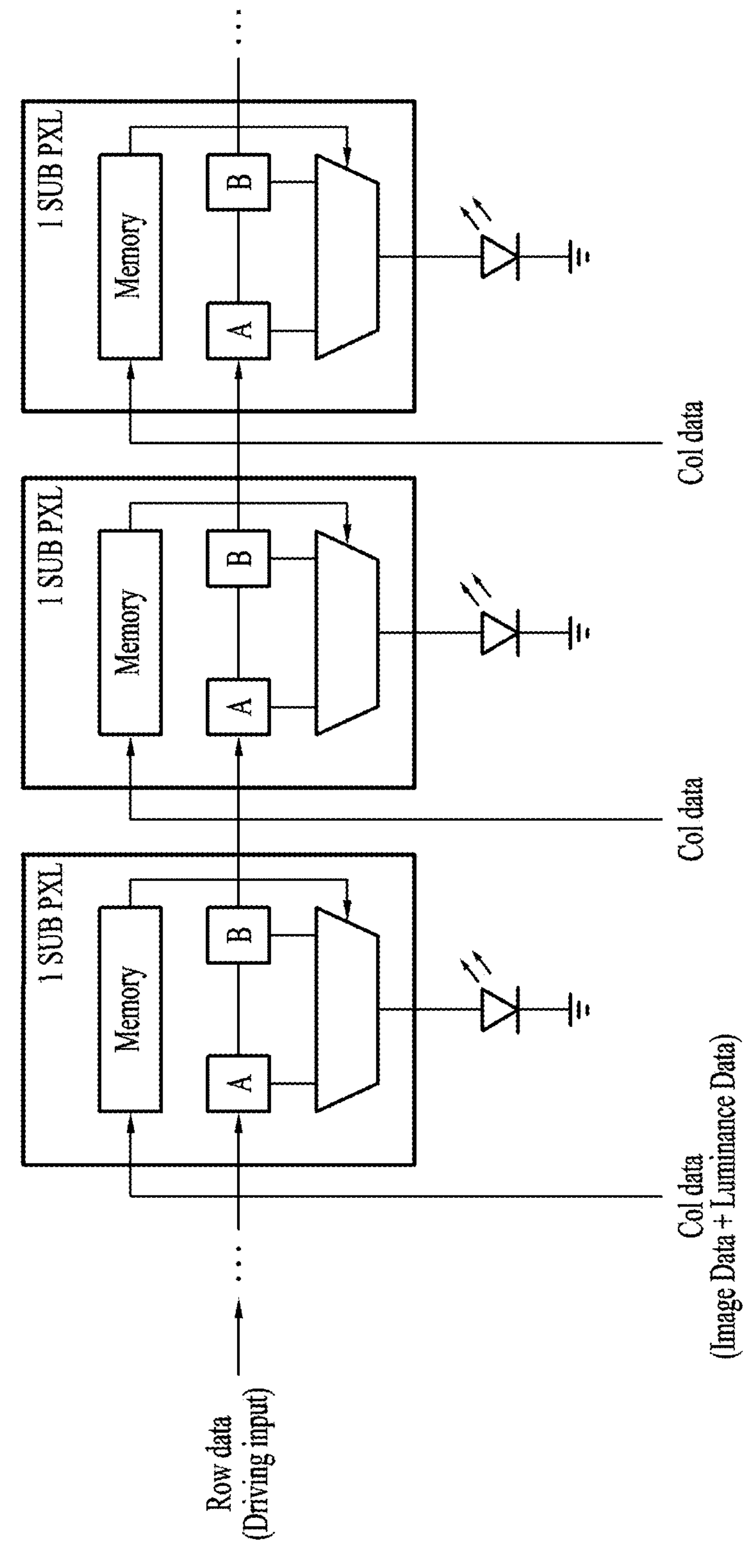
FIG. 10 illustrates an example of describing a subpixel driving method according to one embodiment.

FIG. 10 illustrates an example of describing a subpixel driving method according to one embodiment.

The example of FIG. 10 represents a case in which functions of the selector 915 and the controller 940 of FIG. 9 are provided to each of R, G, and B subpixels. In FIGS. 10, A and B may perform the same functions of the first signal controller 941 and the second signal controller 943, respectively.

Therefore, in FIG. 10, each selector may identify each first subpixel by identifying each subpixel, and thereby select a first control signal or a second control signal.

In FIG. 10, each of subpixels my share an impulse signal and a PWM signal corresponding to row data through a row line. In FIG. 10, each of the subpixels may receive brightness information and the bit values corresponding to column data and may store the same in a memory for each column line.

Figure 11:
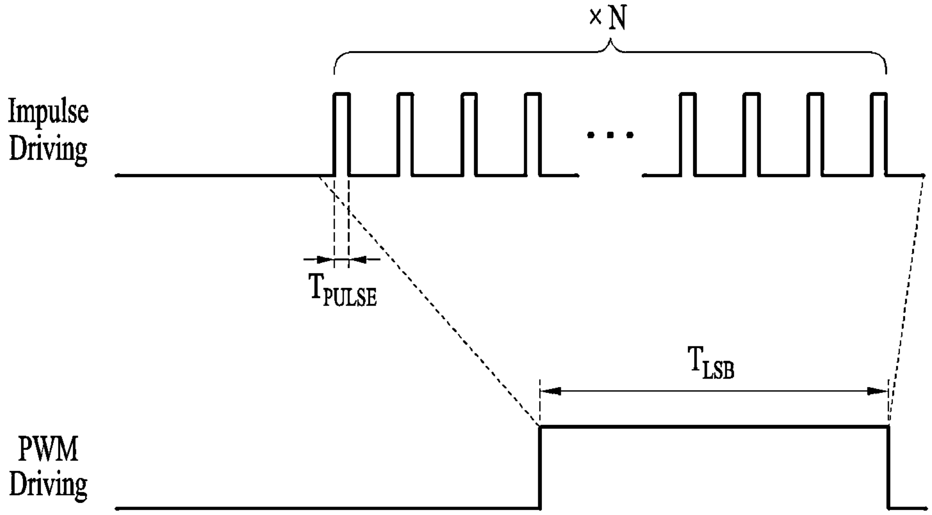
FIG. 11 illustrates an example of describing a relationship between a pulse width modulation (PWM) driving signal and an Impulse driving signal according to one embodiment.

FIG. 11 illustrates an example of describing a relationship between a PWM driving signal and an Impulse driving signal according to one embodiment.

Referring to FIG. 11, the number of impulse signals required for impulse driving in a low grayscale region may be determined based on an amount of time in which a high level of a long pulse for PWM driving is maintained.

For example, assuming $T_{PULSE}$ as an impulse signal width, the number of impulse signals required N may be determined as $T_{LSB}/T_{PULSE}$. Here, $T_{LSB}$ may be a pulse width corresponding to a lower bit of a PWM signal. Also, $T_{LSB}$ may be a short pulse of hundreds of nano seconds (ns) of the PWM signal. Meanwhile, since the impulse signal width is substantially really short, the number of impulse signals N may be adjusted by adjusting an impulse signal generation interval to be tens of ns.

FIG. 12 illustrates an example pixel driver input signals according to one embodiment. FIG. 12 represents an embodiment in which the bit values of image data is '010 . . . 1' and low grayscale region LSB+1 and LSB is driven using an impulse method. The embodiment of FIG. 12 may be applied to the display driving device of FIG. 8.

Since the MSB of the bit values is driven using a PWM signal and is '0', the value input to the level shifter 861 is '0'. Since MSB-1 of the bit values is driven using the PWM signal and is '1', a value input to the level shifter 861 is '1'. Since the LSB 1201 of the bit values is driven using an impulse signal and is '1', a signal input to the level shifter 861 is an impulse signal 1231 for expressing the LSB 1201.

FIG. 13 illustrates an example of describing relationship between the respective signals according to one embodiment.

Referring to FIG. 13, regardless of grayscale information, if brightness information is greater than $L_{TH}$, a PWM driving method is used and if the brightness information is less than or equal to $L_{TH}$, a driving method using an impulse signal is used.

If a 'short' signal is a high level before on duty starts, it indicates that the brightness information is less than or equal to $L_{TH}$. If the bit values of image data is '010 . . . 1', MSB-1 of the bit values is driven using the impulse signals, and a signal input to the level shifter 861 is the impulse signal, which differs from the signal of FIG. 12.

If a 'long' signal is a high level before on duty starts, it indicates that the brightness information is greater than $L_TH$. Therefore, level shifter input may be a PWM signal and a PWM signal based on an image data bit value.

The apparatuses described herein may be implemented using hardware components, software components, and/or a combination of the hardware components and the software components. For example, scan unit 120, data driver 140, detector 830, 930, scan unit 810, controller 940, and selector 915 may be implemented using one or more general-purpose or special purpose computers, such as, for example, a processor, a controller, an arithmetic logic unit (ALU), a digital signal processor, a microcomputer, a field programmable array (FPA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be permanently or temporarily embodied in any type of machine, component, physical equipment, virtual equipment, a computer storage medium or device, or a signal wave to be transmitted to be interpreted by the processing device or to provide an instruction or data to the processing device. The software also may be distributed over network coupled computer systems so that the software is stored and executed in a distributed fashion. The software and data may be stored by one or more computer readable storage media.

The methods according to the above-described example embodiments may be configured in a form of program instructions performed through various computer devices and recorded in computer-readable media. The media may include, alone or in combination with program instructions, data files, data structures, and the like. The program instructions recorded in the media may be specially designed and configured for the example embodiments, or may be known and available to those skilled in the computer software art. Examples of the media include magnetic media such as hard disks, floppy disks, and magnetic tapes; optical media such as CD-ROM and DVDs; magneto-optical media such as floptical disks; and hardware devices that are configured to store program instructions, such as read-only memory (ROM), random access memory (RAM), flash memory, and the like. Examples of the program instructions include a machine language code as produced by a compiler and an advanced language code executable by a computer using an interpreter. The hardware device may be configured to operate as at least one software module, or vice versa.

Although the example embodiments are described with reference to the accompanying drawings, it will be apparent to one of ordinary skill in the art that various alterations and modifications in form and details may be made in these example embodiments without departing from the spirit and scope of the claims and their equivalents. For example, suitable results may be achieved if the described techniques are performed in different order, and/or if components in a described system, architecture, device, or circuit are combined in a different manner, and/or replaced or supplemented by other components or their equivalents.

Therefore, other implementations, other example embodiments, and equivalents of the claims are to be construed as being included in the claims.

What is claimed is:

1. A display device comprising:

a plurality of pixels, each of the plurality of pixels including a luminous element and a pixel circuit connected to the luminous element; and a data driver configured to provide image data and luminance data of the pixels to the pixel circuit, wherein the image data is represented as multi-bit values consisting of a Most Significant Bit (MSB) to a Least Significant Bit (LSB); and a processor configured to generate a Pulse Width Modulation (PWM) signal based on the multi-bit values when the luminance data is greater than a threshold value, and control light-emission and non-emission of the luminous element through the PWM signal, and drive the LSB using an impulse signal when the luminance data is less than the threshold value.

2. The display device of claim 1, wherein, if the luminance data is less than the threshold value, the pixel circuit is configured to drive at least one upper bit of the multi-bit values based on the PWM signal and at least one lower bit of the multi-bit values based on the impulse signal.

3. The display device of claim 1, wherein the number of bits of the multi-bit values, the number of bits being driven based on impulse signals, is determined based on an on-duty ratio corresponding to a light emission period within one frame.

4. The display device of claim 1, wherein the threshold value is determined based on at least one of a display driving frequency, an on-duty ratio, or the number of grayscale bits.

5. The display device of claim 1, wherein the threshold value is determined based on a grayscale-luminance linearity of each of the luminance elements.

6. A display driving method comprising:

receiving image data and luminance data on a display pixel from a processor;

retrieving a luminance value from the luminance data;

comparing the luminance value to a threshold value; and controlling light-emission and non-emission of a luminous element through a PWM signal and an impulse signal when the luminance data is less than the threshold value.

7. The method of claim 6, wherein the image data is represented as multi-bit values consisting of MSB (Most Significant Bit) to LSB (Least Significant Bit), and if the luminance data is less than the threshold value, driving upper bits of the multi-bit values based on the PWM signal and driving lower bits of the multi-bit values based on the impulse signal.

8. A display driving device capable of selecting driving pulse types, the display driving device comprising:

a detector configured to receive and detect luminance data from image data and luminance data on a display pixel including a light emitting diode (LED) from a data driver;

a processor configured to select a pulse width modulation (PWM) signal or an impulse signal based on the luminance data and, when the luminance data is less than a preset reference value, generate a scan signal that includes the impulse signal, and output the scan signal to a row terminal of the display pixel; and a pixel driving circuit disposed in the display pixel and configured to drive the LED based on the image data and the scan signal.

9. The selective display driving device of claim 8, wherein the scan signal includes the PWM signal corresponding to an upper bit of the image data and the impulse signal corresponding to a lower bit of the image data.

10. The display driving device of claim 9, wherein a composition ratio of the PWM signal and the impulse signal is adjusted in response to an on-duty ratio of one frame.

11. The display driving device of claim 10, wherein a proportion of the impulse signal in the scan signal increases according to a decrease in the on-duty ratio.

12. A pixel driving circuit of a display pixel, the pixel driving circuit comprising:

a luminance memory configured to receive luminance data for the display pixel and to store the luminance data;

a memory configured to store bit values of image data;

a controller configured to generate a first control signal based on the bit values and a pulse width modulation (PWM) signal, and generate a second control signal based on the bit values and an impulse signal;

a selector configured to select the first control signal or the second control signal based on the luminance data; and a pixel driver configured to deliver, to an LED, or block driving current based on an output signal of the selector.

13. The pixel driving circuit of claim 12, wherein the selector is configured to select the first control signal if the luminance data is greater than or equal to a preset reference value and to select the second control signal if the luminance data is less than the preset reference value.

14. The pixel driving circuit of claim 12, wherein the selector is configured to select the first control signal in a section corresponding to an upper bit of the bit values and to select the second control signal in a section corresponding to a lower bit of the bit values if the luminance data is less than a preset reference value.

15. The pixel driving circuit of claim 12, wherein the selector is configured to identify each of a plurality of subpixels and to select the first control signal or the second control signal.

* * * * *